United States Patent Office 3,519,649
Patented July 7, 1970

3,519,649
THENYL ESTERS OF CYCLOPROPANE
CARBOXYLIC ACID
Kenzo Ueda, Saitama-ken, Toshio Mizutani, Ikeda-shi, Nobushige Itaya, Minoo-shi, Keimei Fujimoto, Kyoto, and Yoshitosi Okuno, Nishinomiya-shi, Japan, assignors to Sumitomo Chemical Company, Ltd., Osaka, Japan, a corporation of Japan
No Drawing. Filed Oct. 23, 1967, Ser. No. 677,039
Claims priority, application Japan, Oct. 28, 1966, 41/71,225; Nov. 9, 1966, 41/73,962
Int. Cl. A01n 9/12; C07d 63/12
U.S. Cl. 260—332.2                                      8 Claims

ABSTRACT OF THE DISCLOSURE

Novel thenyl esters of cyclopropanecarboxylic acids or chrysanthemic acids having insecticidal activities which are quick acting and harmless to mammals. These novel esters are prepared by esterifying cyclopropanecarboxylic acids having in the ring a methyl, 2-methyl-1-propenyl, 2-methoxycarbonyl-1-propenyl or phenyl group with thenyl alcohols having in the thiopene ring a halogen atom or an alkyl, benzyl, thenyl, furfuryl, alkenyl, alkadienyl or alkylene group. This esterification is effected by the reaction of said acids, or halides or anhydrides thereof, with said alcohols, or by the reaction of halides of said alcohols with said acids.

---

This invention relates to novel thiophene derivatives and, more particularly, to novel thenyl esters of cyclopropanecarboxylic acids having insecticidal activities, and a process for the production thereof. The invention is further concerned with insecticidal compositions containing said novel esters as active ingredients.

As insecticidal compounds which are quick acting and harmless to mammals, pyrethrum extracts and synthetic allethrins have been most useful. Despite their usefulness, however, the above compounds are restricted in uses due to their being relatively expensive.

The present invention aims at providing at low costs novel compounds which are excellent in insecticidal activity as compared with the conventional chrysanthemates and are harmless to mammals.

In accordance with the present invention, there are provided novel compounds represented by the general formula

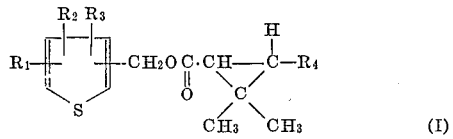

(I)

wherein $R_1$ is a lower alkyl group, halogen atom, benzyl group, thenyl group, furfuryl group, alkenyl group or alkadienyl group, each of said benzyl, thenyl and furfuryl groups may have been nuclear substituted with a lower alkyl group; $R_2$ and $R_3$ are individually a hydrogen atom, halogen atom or alkyl group, and in case both $R_1$ and $R_2$ are alkyl groups, the two may be bonded to each other at the terminals to form an alkylene group; and $R_4$ is a 2-methyl-1-propenyl group, 2-methoxycarbonyl-1-propenyl group or phenyl group.

As cyclopropanecarboxylate-type insecticides, several formulations have been proposed hitherto. These are excellent as insecticides in that they are low in mammalian toxicity, are quick acting on injurious insects and difficultly make injurious insects chemical resistant. On the other hand, however, they have such drawbacks that they are expensive and are difficultly said to be particularly excellent in residual effect.

An object of the present invention is to prepare and provide at low costs insecticides which sufficiently overcome the above drawbacks and are far more excellent than the conventional cyclopropanecarboxylates.

The present inventors found that the thiophene derivatives prepared in accordance with the present process have excellent insecticidal effects not only on sanitary injurious insects and horticultural injurious insects but also on general agricultural injurious insects. Based on the above finding, the inventors have accomplished the present invention.

The novel thiophene derivatives of the present invention are prepared by the reaction of thenyl compound represented by the general formula:

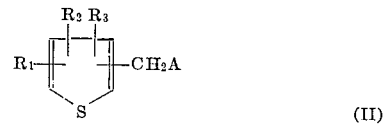

(II)

wherein $R_1$, $R_2$ and $R_3$ have the same significances as mentioned above, and A is hydroxy or a halogen atom, with a cyclopropanecarboxylic acid represented by the general formula:

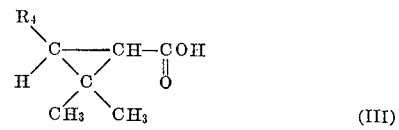

(III)

where $R_4$ has the same significance as mentioned above, or acid halide, anhydride, lower alkyl ester, alkali metal or tertiaryamine salt of the said acid (III).

Most of the thenyl alcohols represented by the general Formula II are novel compounds. These are obtained by reducing corresponding aldehydes, carboxylic acids or esters thereof with metal hydrides or according to other ordinary procedures. They may also be obtained with ease by the hydrolysis of halides or esters thereof. The reaction of thenyl alcohols with cyclopropanecarboxylic acid halides is effected in the presence of a deacidifying agent. The reaction is desirably carried out at or below room temperature. The use of inert solvent is not indispensable but is desirable for smooth progress of the reaction. As the deacidifying agent, a tertiary organic base is preferred, but a carbonate of an alkali metal or alkaline earth metal may also be used.

The reaction of halides of the alcohols having the general Formula II, i.e. thenyl halides represented by the general formula:

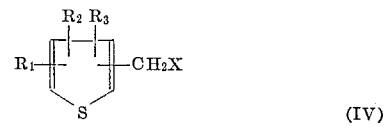

(IV)

wherein $R_1$, $R_2$ and $R_3$ have the same significances as mentioned above; and X is a halogen atom, with the aforesaid carboxylic acids represented by the general Formula III is effected in the presence of a basic condensing agent. In the above reaction, the use of solvent is not indispensable, but an inert solvent such as acetone or methylisobutylketone may preferably be used. As the basic condensing agent, there is used a tertiary organic base such as triethylamine or pyridine, or a hydroxide or carbonate of an alkali metal or alkaline earth metal. In case the tertiary organic base is used, it may be previously reacted with the halide or carboxylic acid, but it is more advantageous to mix and react the three starting materials simultaneously. On the other hand, in case the inorganic hydroxide or carbonate is used, the three starting materials may be simultaneously mixed and reacted, but it is more advantageous to previously react the salt with the carboxylic acid to form a salt.

In producing the thiophene derivatives represented by the general Formula I by reacting the thenyl alcohols of the general Formula II with anhydrides of the carboxylic acids of the general Formula III, the reaction is advantageously effected with reflux at an elevated temperature in an inert solvent such as toluene or xylene, though the reaction progresses at room temperature, as well.

Further, the reaction of thenyl alcohols represented by the general Formula II with the carboxylic acids represented by the general Formula III smoothly progresses at room temperature in the presence of a dehydrating agent such as dicyclohexyl carbodiimide, preferably in an inert solvent such as methylene chloride, benzene or toluene.

Typical examples of the thenyl alcohols represented by the general Formula II, which are employed in the present invention, are 5-methyl-2-thenyl alcohol, 4,5-dimethyl-2-thenyl alcohol, 2,5-dimethyl-3-thenyl alcohol, 2,4,5-trimethyl-3-thenyl alcohol, 5-chloro-2-thenyl alcohol, 4,5-dichloror-2-thenyl alcohol, 2,4,5-trichloro-3-thenyl alcohol, 2,5-dichloror-3-thenyl alcohol, 4,5-tetramethylene-2-thenyl alcohol, 2-methyl-4,5-tetramethylene-3-thenyl alcohol, 5-benzyl-3-thenyl alcohol, 5-benzyl-2-thenyl alcohol, 5-benzyl-2-methyl-3-thenyl alcohol, 4-benzy-5-methyl-2-thenyl alcohol, 5-(4'-methylbenzyl)-2-thenyl alcohol, 5-thenyl-2-thenyl alcohol, 5-(5'-methylthenyl) - 2-thenyl alcohol, 5-thenyl-2-methyl-3-thenyl alcohol and 5-allyl-2-methyl-3-thenyl alcohol.

Among the novel thiophene derivatives obtained according to the present process, there are those having various stereoisomers. It is, however, needless to say that all the stereoisomers having plane structures represented by the aforesaid general Formula I are involved in the scope of the present invention.

The following examples illustrate the procedures for the preparation of the present compounds.

EXAMPLE 1

2.6 g. of 5-methyl-2-thenyl alcohol and 2.4 g. of dry pyridine were dissolved in 20 ml. of dry benzene, and the solution was cooled. To the solution was added a solution of 3.8 g. of dl-cis, trans-chrysanthemic acid chloride in 10 ml. of dry benzene. After thorough shaking, the mixed solution was tightly sealed in a vessel and was allowed to stand overnight at room temperature. On the next day, the reaction liquid was washed successively with 5% hydrochloric acid, 5% aqueous sodium carbonate solution and saturated sodium chloride water, was dried with anhydrous magnesium sulfate and was freed by distillation from the solvent, whereby a yellow oily substance was left. The oily substance was purified by flowing down through an alumina-packed column to obtain 4.9 g. of 5-methyl-2-thenyl dl-cis, trans-chrysanthemate, $n_D^{25}$ 1.5195.

*Elementary analysis.*—Calcd. for $C_{16}H_{22}O_2S$ (percent): C, 69.0; H, 8.0; S, 11.5. Found (percent): C, 69.1; H, 8.0; S, 11.3.

EXAMPLE 2

2.6 g. of 2-methyl-3-thenyl alcohol and 7.9 g. of dl-cis, trans-chrysanthemic anhydride were dissolved in 50 ml. of toluene, and the solution was heated and refluxed for 4 hours. After cooling, the reaction liquid was washed successively with 5% aqueous sodium carbonate solution and saturated sodium chloride water, was dried with anhydrous magnesium sulfate, was freed by distillation from the solvent and was then purified by flowing down through an alumina-packed column to obtain 4.7 g. of 2-methyl-3-thenyl dl-cis, trans-chrysanthemate, $n_D^{25}$ 1.5202.

*Elementary analysis.*—Calcd. for $C_{16}H_{22}O_2S$ (percent): C, 69.0; H, 8.0; S, 11.5. Found (percent): C, 69.0; H, 8.2; S, 11.2.

EXAMPLE 3

2.8 g. of 4,5-dimethyl-2-thenyl alcohol and 3.8 g. of dl-trans-chrysanthemic acid chloride were treated in the same manner as in Example 1 to obtain 5.4 g. of 4,5-dimethyl-2-thenyl dl-trans-chrysanthemate, $n_D^{25}$ 1.5200.

*Elementary analysis.*—Calcd. for $C_{17}H_{24}O_2S$ (percent): C, 69.8; H, 8.3; S, 11.0. Found (percent): C, 69.8; H, 8.1; S, 11.1.

EXAMPLE 4

3.2 g. of 2,5-dimethyl-3-thenyl chloride and 3.4 g. of dl-cis, trans-chrysanthemic acid were dissolved in 30 ml. of methylisobutylketone. To the solution (3.3 g. of triethylamine was added, and the mixed liquid was heated and refluxed for 9 hours. After cooling, the reaction liquid was washed successively with 5% hydrochloric acid, 5% aqueous sodium carbonate solution and saturated sodium chloride water, was dried with anhydrous magnesium sulfate, was freed by distillation from the solvent and was then purified by flowing down through an active alumina-packed column using benzene to obtain 4.8 g. of 2,5-dimethyl-3-thenyl dl-cis, trans-chrysanthemate, $n_D^{25}$ 1.5200.

*Elementary analysis.*—Calcd. for $C_{17}H_{24}O_2S$ (percent): C, 69.8; H, 8.3; S, 11.0. Found (percent): C, 69.9; H, 8.5; S, 11.3.

EXAMPLE 5

3.4 g. of 4,5-tetramethylene-2-thenyl alcohol and 3.8 g. of dl-cis, trans-chrysanthemic acid chloride were treated in the same manner as in Example 1 to obtain 5.7 g. of 4,5-tetramethylene-2-thenyl dl-cis, trans-chrysanthemate, $n_D^{25}$ 1.5356.

*Elementary analysis.*—Calcd. for $C_{19}H_{26}O_2S$ (percent): C, 71.7; H, 8.2; S, 10.1. Found (percent): C, 71.5; H, 8.2; S, 10.0.

EXAMPLE 6

3.7 g. of 4,5-dichloro-2-thenyl alcohol and 3.8 g. of dl-cis, trans-chrysanthemic acid chloride were treated in the same manner as in Example 1 to obtain 5.7 g. of 4,5-dichloro-2-thenyl dl-cis, trans - chrysanthemate, $n_D^{25}$ 1.5371.

*Elementary analysis.*—Calcd. for $C_{15}H_{18}Cl_2O_2S$ (percent): C, 54.1; H, 5.4; S, 9.6. Found (percent): C, 54.4; H, 5.6; S, 9.3.

EXAMPLE 7

4.1 g. of 5-benzyl-2-thenyl alcohol and 3.8 g. of dl-cis, trans-chrysanthemic acid chloride were treated in the same manner as in Example 1 to obtain 6.3 g. of 5-benzyl-2-thenyl dl-cis, trans-chrysanthemate, $n_D^{25}$ 1.5540.

*Elementary analysis.*—Calcd. for $C_{22}H_{26}O_2S$ (percent): C, 74.5; H, 7.4; S, 9.0. Found (percent): C, 74.6; H, 7.4; S, 9.1.

EXAMPLE 8

2.0 g. of 5-benzyl-2-thenyl alcohol and 2.1 g. of dl-cis, trans-2,2-dimethyl-3-phenylcyclopropane - 1 - carboxylic acid chloride were treated in the same manner as in Example 1 to obtain 3.3 g. of 5-benzyl-2-thenyl dl-cis, trans-2,2-dimethyl-3-phenylcyclopropane-1 - carboxylate, $n_D^{25}$ 1.5831.

*Elementary analysis.*—Calcd. for $C_{24}H_{24}O_2S$ (percent): C, 76.6; H, 6.4; S, 8.5. Found (percent): C, 76.3; H, 6.5; S, 8.3.

EXAMPLE 9

2.0 g. of 5-benzyl-3-thenyl alcohol and 1.9 g. of dl-cis, trans-chrysanthemic acid chloride were treated in the same manner as in Example 1 to obtain 3.1 g. of 5-benzyl-3-thenyl dl-cis, trans-chrysanthemate, $n_D^{25}$ 1.5506.

*Elementary analysis.*—Calcd. for $C_{22}H_{26}O_2S$ (percent): C, 74.5; H, 7.4; S, 9.0. Found (percent): C, 74.3; H, 7.5; S, 8.7.

EXAMPLE 10

2.0 g. of 5-benzyl-3-thenyl alcohol and 2.1 g. of d-trans-pyrethric acid were dissolved in 40 ml. of methyl dichloride. The solution was charged with 3 g. of dicyclohexyl carbodiimide and was allowed to stand overnight at room temperature. On the next day, the deposited dicyclohexylurea was separated by filtration, and the reaction liquid was washed successively with 5% aqueous sodium carbonate solution and saturated sodium chloride water, was dried with anhydrous magnesium sulfate and was then freed from the solvent to obtain 3.8 g. of 5-benzyl-3-thenyl d-transpyrethrate, $n_D^{25}$ 1.5613.

*Elementary analysis.*—Calcd. for $C_{23}H_{26}O_4S$ (percent): C, 69.3; H, 6.6; S, 8.0. Found (percent): C, 68.9; H, 6.8; S, 7.7.

EXAMPLE 11

2.2 g. of 2-methyl-5-benzyl-3-thenyl alcohol and 1.9 g. of dl-cis, trans-chrysanthemic acid chloride were treated in the same manner as in Example 1 to obtain 3.4 g. of 2-methyl-5-benzyl-3-thenyl dl-cis, trans-chrysanthemate, $n_D^{25}$ 1.5503.

*Elementary analysis.*—Calcd. for $C_{23}H_{28}O_2S$ (percent): C, 75.0; H, 7.7; S, 8.7. Found (percent): C, 74.8; H, 7.7; S, 8.6.

EXAMPLE 12

2.2 g. of 5-(4'-methylbenzyl)-2-thenyl alcohol and 1.9 g. of dl-cis, trans-chrysanthemic acid chloride were treated in the same manner as in Example 1 to obtain 3.2 g. of 5-(4' - methylbenzyl)-2-thenyl dl-cis, trans-chrysanthemate, $n_D^{25}$ 1.5520.

*Elementary analysis.*—Calcd. for $C_{23}H_{28}O_2S$ (percent): C, 75.0; H, 7.7; S, 8.7. Found (percent): C, 75.0; H, 7.8; S, 8.8.

EXAMPLE 13

2.2 g. of 3,4,5-trichloro-2-thenyl alcohol and 1.9 g. of dl-cis, trans-chrysanthemic acid chloride were treated in the same manner as in Example 1 to obtain 3.4 g. of 3,4,5-trichloro-2-thenyl dl-cis, trans-chrysanthemate, $n_D^{25}$ 1.5462.

*Elementary analysis.*—Calcd. for $C_{15}H_{17}Cl_3O_2S$ (percent): C, 49.0; H, 4.7; S, 8.7. Found (percent) C, 49.5; H, 4.8; S, 9.0.

EXAMPLE 14

2.2 g. of 2,4,5-trichloro-3-thenyl alcohol and 1.9 g. of dl-cis, trans-chrysanthemic acid chloride were treated in the same manner as in Example 1 to obtain 3.2 g. of 2,4,5-trichloro-3-thenyl dl-cis, trans-chrysanthemate, $n_D^{25}$ 1.5436.

*Elementary analysis.*—Calcd. for $C_{15}H_{17}Cl_3O_2S$ (percent): C, 49.0; H, 4.7; S, 8.7. Found (percent): C, 49.4; H, 4.7; S, 8.9.

EXAMPLE 15

1.4 g. of 5-ethyl-2-thenyl alcohol and 1.9 g. of dl-cis, trans-chrysanthemic acid chloride were treated in the same manner as in Example 1 to obtain 2.7 g. of 5-ethyl-2-thenyl dl-cis, trans-chrysanthemate, $n_D^{25}$ 1.5190.

*Elementary analysis.*—Calcd. for $C_{17}H_{24}O_2S$ (percent): C, 68.8; H, 8.3; S, 11.0. Found (percent): C, 70.4 H, 8.4; S, 10.5.

EXAMPLE 16

1.6 g. of 4-methyl-5-ethyl-2-thenyl alcohol and 1.9 g. of dl-cis, trans-chrysanthemic acid chloride were treated in the same manner as in Example 1 to obtain 2.8 g. of 4-methyl-5-ethyl-2-thenyl dl-cis, trans-chrysanthemate, $n_D^{25}$ 1.5170.

*Elementary analysis.*—Calcd. for $C_{18}H_{26}O_2S$ (percent): C, 70.5; H, 8.6; S, 10.5. Found (percent): C, 70.7; H, 8.6; S, 10.3.

EXAMPLE 17

1.7 g. of 4,5-diethyl-2-thenyl alcohol and 1.9 g. of dl-cis, trans-chrysanthemic acid chloride were treated in the same manner as in Example 1 to obtain 3.0 g. of 4,5-diethyl-2-thenyl dl-cis, trans-chrysanthemate, $n_D^{25}$ 1.5131.

*Elementary analysis.*—Calcd. for $C_{19}H_{28}O_2S$ (percent): C, 71.2; H, 8.8; S, 10.0. Found (percent): C, 71.2; H, 8.4; S, 9.2.

EXAMPLE 18

1.5 g. of 5-allyl-2-thenyl alcohol and 1.9 g. of dl-cis, trans-chrysanthemic acid chloride were treated in the same manner as in Example 1 to obtain 2.6 g. of 5-allyl-2-thenyl dl-cis, trans-chrysanthemate, $n_D^{25}$ 1.5294.

*Elementary analysis.*—Calcd. for $C_{18}H_{24}O_2S$ (percent): C, 71.0; H, 7.9; S, 10.5. Found (percent): 70.6; H, 7.9; S, 10.4.

EXAMPLE 19

2.1 g. of 5-(2'-thenyl)-2-thenyl alcohol and 1.9 g. of dl-cis, trans-chrysanthemic acid chloride were treated in the same manner as in Example 1 to obtain 3.3 g. of 5-(2'-thenyl)-2-thenyl dl-cis, trans-chrysanthemate, $n_D^{25}$ 1.5612.

*Elementary analysis.*—Calcd. for $C_{20}H_{24}O_2S_2$ (percent): C, 66.6; H, 6.7; S, 17.8. Found (percent): C, 66.2; H, 6.6; S, 17.4.

EXAMPLE 20

2.3 g. of 5-(5'-methyl-2'-thenyl)-2-thenyl alcohol and 1.9 g. of dl-cis, trans-chrysanthemic acid chloride were treated in the same manner as in Example 1 to obtain 3.3 g. of 5-(5'-methyl-2'-thenyl)-2-thenyl dl-cis, trans-chrysanthemate, $n_D$ 1.5567.

*Elementary analysis.*—Calcd. for $C_{21}H_{26}O_2S_2$ (percent): C, 67.3; H, 7.0; S, 17.1. Found (percent): C, 67.6; H, 7.2; S, 17.2.

EXAMPLE 21

1.9 g. of 5-(2'-furfuryl)-2-thenyl alcohol and 1.9 g. of dl-cis, trans-chrysanthemic acid chloride were treated in the same manner as in Example 1 to obtain 3.1 g. of 5-(2'-furfuryl)-2-thenyl dl-cis, trans-chrysanthemate, $n_D^{25}$ 1.5366.

*Elementary analysis.*—Calcd. for $C_{20}H_{24}O_3S$ (percent): C, 69.7; H, 7.0; S, 9.3. Found (percent): C, 69.9; H, 7.0; S, 8.8.

There are no insecticides available at present, which are quick acting, harmless to mammals and usable without anxiety, other than pyrethrum extracts (containing pyrethrin) or synthetic allethrins which are homologs of the active ingredient of said pyrethrum extracts. Despite their usefulness, however, the pyrethrum extracts and the like are liable to be restricted in uses due to their being relatively expensive.

In contrast thereto, the thiophene derivatives of the present invention can be prepared at low costs, as mentioned before, and they not only display excellent insecticidal activity against houseflies, mosquitoes, cockroaches and the like sanitary injurious insects but also are low in toxicity to mammals.

In view of the above characteristics, insecticidal compositions containing as active ingredients the present thiophene derivatives represented by the general Formula I find a wide scope of uses particularly for prevention of epidemics. In addition, said compositions show excellent insecticidal activity against insects injurious to stored cereals, agriculture and forest, and hence are markedly useful for the prevention and extermination of said injurious insects. Further, due particularly to their low toxicity, the compositions are also excellent in that they are freely usable for crops before harvest, home horticulture, green house cultivation and packing materials for foods.

Of the compounds represented by the aforesaid general Formula I, particularly useful for the object of the present invention are those shown below, but it is needless to say that the present invention is not limited only to these.

| Compound No. | Structure |
|---|---|
| (1) | 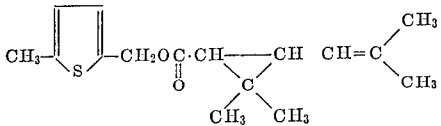<br>5-methyl-2-thenyl chrysanthemate |
| (2) | 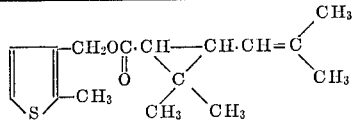<br>2-methyl-3-thenyl chrysanthemate |
| (3) | 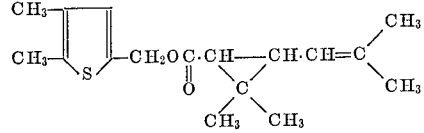<br>4,5-dimethyl-2-thenyl chrysanthemate |
| (4) | 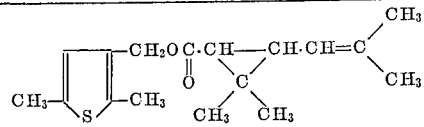<br>2,5-dimethyl-3-thenyl chrysanthemate |
| (5) | 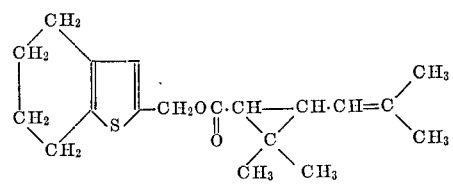<br>4,5-tetramethylene-2-thenyl chrysanthemate |
| (6) | 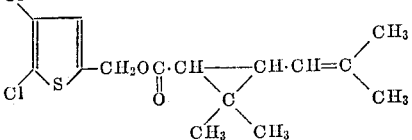<br>4,5-dichloro-2-thenyl chrysanthemate |
| (7) | 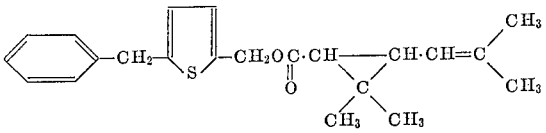<br>5-benzyl-2-thenyl chrysanthemate |
| (8) | 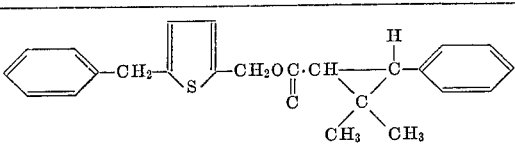<br>5-benzyl-2-thenyl-2,2-dimethyl-3-phenylcyclopropane-1-carboxylate |
| (9) | 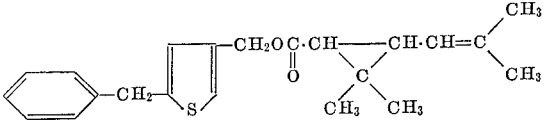<br>5-benzyl-3-thenyl chrysanthemate |
| (10) | 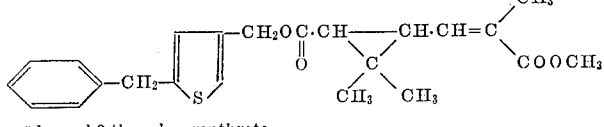<br>5-benzyl-3-thenyl pyrenthrate |

| No. | Compound | Structure |
|---|---|---|
| (11) | | 2-methyl-5-benzyl-3-thenyl chrysanthemate |
| (12) | | 5-(4'-methylbenzyl)-2-thenyl chrysanthemate |
| (13) | | 3,4,5-trichloro-2-thenyl chrysanthemate |
| (14) | | 2,4,5-trichloro-3-thenyl chrysanthemate |
| (15) | | 5-ethyl-2-thenyl chrysanthemate |
| (16) | | 4-methyl-5-ethyl-2-thenyl chrysanthemate |
| (17) | | 4,5-diethyl-2-thenyl chrysanthemate |
| (18) | | 5-allyl-2-thenyl chrysanthemate |
| (19) | | 5-(2'-thenyl)-2-thenyl chrysanthemate |

The present compositions may be formulated, as occasion demands, into any forms of oil sprays, oil solutions, emulsifiable concentrate, dusts, wettable powders, aerosols, mosquito coils, fumigants, baits and granular preparations, according to processes thoroughly known to those skilled in the art, using diluting adjuvants for common insecticides. Further, they may be formulated into death-including powdery or solid preparations incorporated with baits or other materials attractive for injurious insects.

The present insecticides may be increased in insecticidal effects when used in admixture with α[2-(2-butoxyethoxy)-ethoxy]-4,5-methylenedioxy-2-propyltoluene (hereinafter referred to as "piperonyl butoxide"), 1,2-methylenedioxy - 4-[2-(octylsulfinyl)-propyl]-benzene (hereinafter referred to as "sulfoxide"), N-(2-ethylhexyl)-bicyclo-(2,2,1)-hepta-5-ene-anhydrophthalic acid-2,3-dicarboxy-imide (hereinafter referred to as "MGK-264," registered trade name for said imide produced by McRolin Gormley King Co.), or the like synergist for pyrethroides. When the present compounds are formulated into incense sticks, the insecticidal effects of the incense sticks can be increased by incorporation of 3,4-methylenedioxybenzoic acid, 2,6-di-tert. butyl-4-methylphenol, benzene-para-dicarboxylic acid, benzene-meta-dicarboxylic acid, para-tert. butyl-benzoic acid, piperonyl para-tert. butyl-benzoate, 1-methyl-2-carboxy-4-isopropylcyclohexanone-(3), 3-methoxy-4-hydroxybenzoic acid, or 2-isopropyl-4-acetylvaleric acid. In addition, the present compounds may be formulated into multi-purpose compositions by incorporation of other active ingredients such as, for example, pyrethroide type insecticides, organo-phosphorus type insecticides, e.g. O,O-dimethyl-O-(3-methyl-4-nitrophenyl) thiophosphate (hereinafter referred to as "Sumithion," registered trade name for said compound produced by Sumitomo Chemical Co., Ltd.), O,O-dimethyl-2,2-dichlorovinyl phosphate (hereinafter referred to as "DDVP"), O,O-diethyl-O-(2-isopropyl-4-methyl-6 - pyrimidyl) phosphorothioate (hereinafter referred to as "diazinon"), or O,O-dimethyl-O-(3-methyl-4-methylthio) phosphorothioate (hereinafter refrered to as "Baytex"); organochlorine type insecticides, e.g. 1,1,1 - trichloro-2,2-bis(p - chlorophenyl)-ethane (hereinafter referred to as "DDT"), 1,2,3,4,5,6-hexachlorocyclohexane (hereinafter referred to as "BHC") or 1,1,1 - trichloro-2,2-bis (p-methoxyphenyl)-ethane (hereinafter referred to as "methoxychlor"); carbamate type insecticides, e.g. 1 - naphthyl-N-methylcarbamate (hereinafter referred to as "Sevin"), or the like insecticides, fungicides, miticides, herbicides, fertilizers and other agricultural chemicals.

The preparation and effects of the present compositions will be illustrated in detail below with reference to examples and test samples, but the scope of the present invention is by no means limited to the examples. In the examples, the names of compounds are represented by the numbers of the compounds exemplified previously.

EXAMPLE 1

0.5 part of the present compound (1) was dissolved in kerosene to make 100 parts, whereby an oil spray was obtained.

EXAMPLE 2

20 parts of the present compound (1), 10 parts of Sorpol SM–200 (registered trade name for an emulsifier produced by Toho Kagaku K.K.) and 70 parts of xylene were mixed together and dissolved with stirring to obtain an emulsifiable concentrate.

EXAMPLE 3

0.5 part of the present compound (2) was dissolved in kerosene to make 100 parts, whereby an oil spray was obtained.

EXAMPLE 4

0.2 part of the present compound (3) was dissolved in kerosene to make 100 parts, whereby an oil spray was obtained.

EXAMPLE 5

10 parts of the present compound (3), 10 parts of Sorpol SM–200 and 80 parts of xylene were mixed, stirred and dissolved together to obtain an emulsifiable concentrate.

EXAMPLE 6

5 parts of the present compound (3) was mixed with 5 parts of Toyoligin CT (registered trade name for a product of Toyo Boseki K.K.) and 90 parts of GSM clay (trade name for a clay produced by Zieklite Kogyo K.K.), and the mixture was thoroughly stirred in a mortar. Subsequently, the mixture was charged with water in an amount of 10% based on the mixture, was further stirred, was granulated by means of a granulator, and was then air-dried to obtain a granular preparation.

EXAMPLE 7

0.2 part of the present compound (3), 0.2 part of N-(3,4,5,6 - tetrahydrophthalimide)-methyl chrysanthemate (hereinafter referred to as "phthalthrin"), 2 parts of methoxychlor, 5 parts of xylene and 7.6 parts of deodorized kerosene were mixed and dissolved together. The thus obtained solution was filled in an aerosol container. After attaching a valve portion to the container, 85 parts of a propellant (e.g. Freon, vinyl chloride monomer or liquefied petroleum gas) was charged therein under pressure through said valve portion to obtain an aerosol.

EXAMPLE 8

0.5 part of the present compound (4) and 2 parts of piperonyl butoxide were dissolved in kerosene to make 100 parts, whereby an oil spray was obtained.

EXAMPLE 9

20 parts of the present compound (4), 10 parts of Sorpol 2020 (registered trade name for an emulsifier produced by Toho Kagaku K.K.) and 70 parts of xylene were mixed, stirred and dissolved together to obtain an emulsifiable concentrate.

EXAMPLE 10

0.5 part of the present compound (5) was dissolved in kerosene to make 100 parts, whereby an oil spray was obtained.

EXAMPLE 11

0.2 part of the present compound (6) was dissolved in kerosene to make 100 parts, whereby an oil spray was obtained.

EXAMPLE 12

1 part of the present compound (6) was dissolved in 20 parts of acetone. To the solution, 99 parts of 300 mesh diatomaceous earth was added. The mixture was thoroughly stirred in a mortar and was then freed from acetone by vaporization to obtain a dust.

EXAMPLE 13

0.05 part of the present compound (7) was dissolved in kerosene to make 100 parts, whereby an oil spray was obtained.

EXAMPLE 14

0.2 part of the present compound (7), 0.2 part of phthalthrin, 13.6 parts of deodorized kerosene and 1 part of Atmos 300 (registered trade name for an emulsifier produced by Atlas Chemical Co.) were mixed together. The mixture was emulsified by addition of 50 parts of pure water and was then filled in an aerosol container together with 35 parts of a 3:1 mixture of deodorized butane and deodorized propane, whereby a water-based aerosol was obtained.

EXAMPLE 15

0.2 part of the present compound (7), 1 part of a pyrethrum extract (containing 20% of pyrethrin), 0.5 part of Sumithion, 5.7 parts of xylene and 7.6 parts of deodorized kerosene were mixed and dissolved together. The resulting solution was filled in an aerosol container and the same procedure as in Example 7 was effected to obtain an aerosol.

EXAMPLE 16

25 parts of the present compound (7) and 5 parts of Sorpol SM-200 were thoroughly mixed together. The mixture was charged with 70 parts of 300 mesh talc and was thoroughly stirred in a mortar to obtain a wettable powder.

EXAMPLE 17

5 parts of the present compound (7) was mixed with 5 parts of Toyolignin CT and 90 parts of GSM clay, and the mixture was treated in the same manner as in Example 6 to obtain a granular preparation.

EXAMPLE 18

0.5 g. of the present compound (7) was dissolved in 20 ml. of methanol. The solution was homogeneously mixed with 99.5 g. of a mosquito coil carrier (a 5:3:1 mixture of Tabu powder, Pyrethrum marc and wood powder). After vaporizing methanol, the mixture was charged with 150 ml. of water and was thoroughly kneaded. The thus kneaded mixture was shaped and dried to obtain a mosquito coil.

EXAMPLE 19

1 part of the present compound (7) was dissolved in 20 parts of acetone. To the solution, 99 parts of 300 mesh diatomaceous earth was added. The mixture was thoroughly stirred in a mortar and was then freed from acetone by vaporization to obtain a dust.

EXAMPLE 20

0.3 part of the present compound (8) and 0.1 part of DDVP were dissolved in kerosene to make 100 parts, whereby an oil spray was obtained.

EXAMPLE 21

25 parts of the present compound (8), 15 parts of Sorpol 2020 and 60 parts of xylene were mixed, stirred and dissolved together to obtain an emulsifiable concentrate.

EXAMPLE 22

0.01 part of the present compound (9) was dissolved in kerosene to make 100 parts, whereby an oil spray was obtained.

EXAMPLE 23

0.2 part of the present compound (9), 0.2 part of phthalthrin, 7.1 parts of xylene and 7.5 parts of deodorized kerosene were mixed and dissolved together. The resulting solution was filled in an aerosol container and the same procedure as in Example 7 was effected to obtain an aerosol.

EXAMPLE 24

10 parts of the present compound (9), 10 parts of Sorpol SM–200 and 80 parts of xylene were mixed, stirred and dissolved together to obtain an emulsifiable concentrate.

EXAMPLE 25

5 parts of the present compound (9) was mixed with 5 parts of Toyolignin and 90 parts of GSM clay, and the mixture was treated in the same manner as in Example 6 to obtain a granular preparation.

EXAMPLE 26

0.5 g. of the present compound (9) was dissolved in 20 ml. methanol. The resulting solution was homogeneously mixed with 99.5 g. of a mosquito coil carrier (a 5:3:1 mixture of Tabu powder, Pyrethrum marc and wood powder). Subsequently, the mixture was treated in the same manner as in Example 18 to obtain a mosquito coil.

EXAMPLE 27

1 part of the present compound (9) was dissolved in 20 parts of acetone. To the solution, 99 parts of 300 mesh diatomaceous earth was added. The mixture was thoroughly stirred in a mortar and was then freed from acetone by vaporization to obtain a dust.

EXAMPLE 28

0.01 part of the present compound (10) was dissolved in kerosene to make 100 parts, whereby an oil spray was obtained.

EXAMPLE 29

0.2 part of the present compound (10), 0.02 part of phthalthrin, 13.6 parts of deodorized kerosene and 1 part of the emulsifier Atmos 300 were mixed together. The mixture was emulsified by addition of 50 parts of pure water and was then treated in the same manner as in Example 14 to obtain a water-based aerosol.

EXAMPLE 30

10 parts of the present compound (10), 5 parts of allethrin, 10 parts of Sorpol SM–200 and 75 parts of xylene were mixed, stirred and dissolved together to obtain an emulsifiable concentrate.

EXAMPLE 31

0.1 part of the present compound (11) was dissolved in kerosene to make 100 parts, whereby an oil spray was obtained.

EXAMPLE 32

10 parts of the present compound (11), 10 parts of Sorpol 2020 and 80 parts of xylene were mixed, stirred and dissolved together to obtain an emulsifiable concentrate.

EXAMPLE 33

0.2 part of the present compound (12) was dissolved in kerosene to make 100 parts, whereby an oil spray was obtained.

EXAMPLE 34

10 parts of the present compound (12), 10 parts of Sorpol SM–200 and 80 parts of xylene were mixed, stirred and dissolved, together to obtain an emulsifiable concentrate.

EXAMPLE 35

1 part of the present compound (12) and 0.5 part of Sevin were dissolved in 30 parts of acetone. To the solution, 98.5 parts of talc was added. The mixture was thoroughly stirred in a mortar and was then freed from acetone by vaporization to obtain a dust.

EXAMPLE 36

5 parts of the present compound (13), 10 parts of Sorpol SM–200 and 85 parts of xylene were mixed, stirred and dissolved together to obtain an emulsifiable concentrate.

EXAMPLE 37

10 parts of the present compound (14), 10 parts of Sorpol SM–200 and 80 parts of xylene were mixed, stirred and dissolved together to obtain an emulsifiable concentrate.

EXAMPLE 38

0.2 part of the present compound (15) was dissolved in kerosene to make 100 parts, whereby an oil spray was obtained.

EXAMPLE 39

10 parts of the present compound (16), 10 parts of Sorpol 2020 and 80 parts of xylene were mixed, stirred and dissolved together to obtain an emulsifiable concentrate.

EXAMPLE 40

15 parts of the present compound (17), 10 parts of Sorpol 2020 and 75 parts of xylene were mixed, stirred and dissolved together to obtain an emulsifiable concentrate.

EXAMPLE 41

0.1 part of the present compound (18) was dissolved in kerosene to make 100 parts, whereby an oil spray was obtained.

EXAMPLE 42

0.2 part of the present compound (18), 0.2 part of phthalthrin, 7.1 parts of xylene and 7.5 parts of deodorized kerosene were mixed and dissolved together. The resulting solution was filled in an aerosol container and the same procedure as in Example 7 was effected to obtain an aerosol.

EXAMPLE 43

3 parts of the present compound (18) was mixed with 5 parts of Toyolignin CT and 92 parts of GSM clay, and the mixture was thoroughly stirred in a mortar. Subsequently, the mixture was charged with water in an amount of 10% based on the mixture, was further stirred, was granulated by means of a granulator and was then air-dried to obtain a granular preparation.

EXAMPLE 44

0.5 g. of the present compound (18) was dissolved in 20 ml. of methanol. The solution was homogeneously mixed with a mosquito coil carrier (a 5:3:1 mixture of Tabu powder, Pyrethrum marc and wood powder). After vaporizing methanol, the mixture was charged with 150 ml. of water and was thoroughly kneaded. The thus kneaded mixture was shaped and dried to obtain a mosquito coil.

EXAMPLE 45

10 parts of the present compound (18), 10 parts of Sorpol 2020 and 80 parts of xylene were mixed, stirred and dissolved together to obtain an emulsifiable concentrate.

EXAMPLE 46

0.05 part of the present compound (19) was dissolved in kerosene to make 100 parts, whereby an oil spray was obtained.

EXAMPLE 47

0.2 part of the present compound (19), 0.2 part of phthalthrin, 13.6 parts of deodorized kerosene and 1 part of emulsifier Atmos 300 were mixed together. The mixture was emulsified by addition of 50 parts of pure water and was then filled in an aerosol container together with a 3:1 mixture of deodorized butane and deodorized propane, whereby a water-based aerosol was obtained.

EXAMPLE 48

0.5 g. of the present compound (19) was dissolved in 20 ml. of methanol. The resulting solution was homogeneously mixed with 99.5 g. of a mosquito coil carrier (a 5:3:1 mixture of Tabu powder, Pyrethrum marc and wood powder). After vaporizing methanol, the mixture was charged with 150 ml. of water and was thoroughly kneaded. The thus kneaded mixture was shaped and dried to obtain a mosquito coil.

EXAMPLE 49

1 part of the present compound (19) was dissolved in 20 parts of acetone. To the solution, 99 parts of 300 mesh diatomaceous earth was added. Subsequently, the mixture was thoroughly stirred in a mortar and was then freed from acetone by vaporization to obtain a dust.

EXAMPLE 50

10 parts of the present compound (19), 10 parts of Sorpol SM-200 and 80 parts of xylene were mixed, stirred and dissolved together to obtain an emulsifiable concentrate.

EXAMPLE 51

0.2 part of the present compound (20) was dissolved in kerosene to make 100 parts, whereby an oil spray was obtained.

EXAMPLE 52

15 parts of the present compound (20), 10 parts of Sorpol SM-200 and 75 parts of xylene were mixed, stirred and dissolved together to obtain an emulsifiable concentrate.

EXAMPLE 53

0.2 part of the present compound (21) was dissolved in kerosene to make 100 parts, whereby an oil spray was obtained.

EXAMPLE 54

0.2 part of the present compound (21), 0.2 part of phthalthrin, 13.6 parts of deodorized kerosene and 1 part of the emulsifier Atmos 300 were mixed together. The mixture was emulsified by addition of 50 parts of pure water and was then filled in an aerosol container together with 35 parts of a 3:1 mixture of deodorized butane and deodorized propane, whereby a water-based aerosol was obtained.

EXAMPLE 55

10 parts of the present compound (21), 10 parts of Sorpol 2020 and 10 parts of xylene were mixed, stirred and dissolved together to obtain an emulsifiable concentrate.

The insecticidal effects of the present compositions obtained in the above manners will be shown with reference to the following test examples:

TEST EXAMPLE 1

The oil sprays obtained according to Examples 1, 3, 4, 8, 10, 11, 13, 20, 22, 28, 31, 33, 38, 41, 46, 51 and 53 were individually sprayed in an amount of 5 ml. using Compbel's turn table apparatus ("Soap and Sanitary Chemicals," vol. 14, No. 6, 119 (1938)). After 20 seconds from the spray, the shutter was opened, and housefly adults (about 100 flies per group) were exposed to the settling mist for 10 minutes and where then transferred to an observation cage. In the cage, the flies were fed and were allowed to stand for one day at room temperature. Thereafter, the number of killed flies was counted to calculate the mortality thereof. The results were as shown in Table 1.

TABLE 1

| Composition: | Mortality (percent) |
|---|---|
| Oil spray of Example— | |
| 1 (containing 0.5% of compound (1)) | 84 |
| 3 (containing 0.5% of compound (2)) | 58 |
| 4 (containing 0.2% of compound (3)) | 82 |
| 8 (containing 0.5% of compound (4)) and 2% of butoxide | 91 |
| 10 containing 0.5% of compound (5)) | 80 |
| 11 (containing 0.2% of compound (6)) | 87 |
| 13 (containing 0.05% of compound (7)) | 85 |
| 20 (containing 0.3% of compound (8)) and 0.1% of DDVP | 89 |
| 22 (containing 0.01% of compound (9)) | 100 |
| 28 (containing 0.01% of compound (10)) | 100 |
| 31 (containing 0.1% of compound (11)) | 98 |
| 33 (containing 0.2% of compound (12)) | 80 |
| 38 (containing 0.2% of compound (15)) | 94 |
| 40 (containing 0.1% of compound (18)) | 81 |
| 46 (containing 0.005% of compound (19)) | 74 |
| 51 (containing 0.2% of compound (20)) | 98 |
| 53 (containing 0.2% of compound (21)) | 94 |
| 0.2% allethrin oil spray | 78 |

TEST EXAMPLE 2

The insecticidal effects on housefly adults of the aerosols formulated according to the Examples 7, 14, 15, 23, 29, 42, 47 and 54 were tested by the aerosol test method using Peet Grady's chamber the method disclosed in "Soap and Chemical Specialties, Blue Book" (1965). The results were as shown in Table 2.

TABLE 2

| Composition | Sprayed amount (g./100 ft.³) | Knock-down ratio (percent) | | | Mortality (percent) |
|---|---|---|---|---|---|
| | | 5 min. | 10 min. | 15 min. | |
| Aerosol of Example 7 | 3.01 | 9 | 29 | 68 | 57 |
| Water-based aerosol of Example 14 | 3.05 | 8 | 37 | 73 | 60 |
| Aerosol of Example 15 | 3.03 | 12 | 42 | 80 | 75 |
| Aerosol of Example 23 | 2.09 | 18 | 34 | 88 | 88 |
| Water-based aerosol of Example 29 | 2.08 | 15 | 45 | 91 | 91 |
| Aerosol of Example 42 | 3.10 | 18 | 48 | 80 | 76 |
| Water-based aerosol of Example 47 | 3.30 | 17 | 50 | 80 | 62 |
| Water-based aerosol of Example 54 | 3.01 | 9 | 40 | 73 | 59 |

TEST EXAMPLE 3

10 l. of water was poured into a 14 l. polypropylene bucket. Into the water, the granular preparation formulated according to Examples 6, 17, 25 and 43 were individually charged in an amount of 400 mg. After one day, full grown northern house mosquito larvae were liberated in the water, whereby more than 95% of the larvae could be killed within 24 hours.

TEST EXAMPLE 4

About 20 northern house mosquito adults were liberated in a 70 cm.³ glass chamber. Each 1 g. of the mosquito coil formulated according to Examples 18, 26, 44 and 48 were ignited on both ends and were individually placed at the center in the chamber. Thereafter, the number of knock-down insects was counted with lapse of time to calculate KT 50 value (time required for 50% knock-down), the results were as shown in Table 3.

TABLE 3

Composition:            KT 50 (min., sec.)

Mosquito coil of Example 18 _____ 9′ 10″
Mosquito coil of Example 26 _____ 7′ 40″
Mosquito coil of Example 44 _____ 7′ 10″
Mosquito coil of Example 48 _____ 7′ 30″
0.5% allethrin mosquito coil _____ 8′ 00″

TEST EXAMPLE 5

A glass Petri dish of 14 cm. in inner diameter and 7 cm. in height was coated on the inner wall with butter, leaving at the lower part an uncoated portion of 1 cm. in width. Onto the bottom of the dish, the dusts formulated according to Examples 12, 19, 27 and 49 were uniformly dusted individually in a proportion of 2 g./m.². Subsequently, 10 German cockroach adults were liberated in the dish and were contacted with the individual dusts for 30 minutes. After one day, more than 90% of the cockroaches were knocked-down and after 3 days, more than 90% of the insects could be killed.

TEST EXAMPLE 6

In 1/50,000 Wagner pots were grown rice plants which had elapsed 45 days after sowing. The emulsifiable concentrates obtained according to Examples 5, 24, 45, 50 and 55, and the wettable powder formulated according to Example 16 were diluted with water to respective test concentrations. The thus prepared test solutions were individually sprayed onto the rice plants in a proportion of 10 ml. per pot, and each pot was covered with wire net. Into the net, 30 adults of green rice leaf hoppers were liberated, and the number of the knocked-down insects were observed with lapse of time to calculate KT 50 value. Further, after 24 hours, the number of killed insects was counted to calculate mortality. The results were as shown in Table 4.

TABLE 4

| Composition | Concentration (diluted to) | KT 50 (min.) | Mortality after 24 hours (percent) |
|---|---|---|---|
| Emulsifiable concentrate of Example— | | | |
| 5 | X200 | 21 | 90 |
| 24 | X400 | 15 | 100 |
| 45 | X400 | 14 | 100 |
| 50 | X400 | 17 | 100 |
| 55 | X400 | 15 | 100 |
| Wettable powder of Example 16 | X400 | 18 | 92 |
| 50% Malathon emulsifiable concentrate | X1,000 | 30 | 100 |

TEST EXAMPLE 7

The emulsifiable concentrate formulated according to Examples 2, 9, 21, 30, 32, 34, 36, 37, 39, 40, 52 and 55 were individually diluted with water to 100,000 times. Each 2 l. of the thus prepared test solutions were individually charged in a styrol case of 23 cm. x 30 cm. with a depth of 6 cm. Into the case, about 100 larvae of northern house mosquitoes were liberated, whereby 95% or more of the insects were killed on the next day.

TEST EXAMPLE 8

In a 1/50,000 Wagner pot were grown rice plants which had elapsed 45 days after sowing. Onto the rice plants, the dust formulated according to Example 35 was dusted by means of a bell jar duster in a proportion of 300 mg./pot. In the same manner as in Test Example 7, the KT 50 value of green rice leaf hoppers and the mortality thereof after 24 hours were calculated. The results were as shown in Table 5.

TABLE 5

| Composition | KT 50 (min.) | Mortality after 24 hours (percent) |
|---|---|---|
| Dust of Example 35 | 20 | 100 |
| 1.5% Malathon dust | 36 | 100 |

We claim:
1. A thiophene derivative represented by the general formula

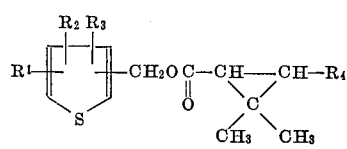

wherein $R_1$ is one member selected from the group consisting of lower alkyl, benzyl, thenyl, furfuryl, lower alkenyl and lower alkadienyl groups, and halogen atoms, each of said benzyl, thenyl and furfuryl groups may be nuclear substituted with a lower alkyl group, $R_2$ and $R_3$ are individually one member selected from the group consisting of hydrogen and halogen atoms and alkyl groups; and in case both $R_1$ and $R_2$ are alkyl groups, the two may be bonded with each other at the terminals to form a 4,5-tetramethylene group; and $R_4$ is one member selected from the group consisting of 2-methyl-1-propenyl, 2-methoxycarbonyl-1-propenyl and phenyl groups.

2. A compound according to claim 1 wherein $R_1$ is benzyl, $R_2$ and $R_3$ are each hydrogen and $R_4$ is 2-methyl-1-propenyl.

3. A compound according to claim 1 wherein $R_1$, $R_2$ and $R_3$ are each chlorine and $R_4$ is 2-methyl-1-propenyl.

4. A compound according to claim 1 wherein $R_1$ is ethyl, $R_2$ and $R_3$ are each hydrogen and $R_4$ is 2-methyl-1-propenyl.

5. A compound according to claim 1 wherein $R_1$ is allyl, $R_2$ and $R_3$ are each hydrogen and $R_4$ is 2-methyl-1-propenyl.

6. 5-benzyl-3-thenyl chrysanthemate.

7. 3,4,5-trichloro-2-thenyl chrysanthemate.

8. 5-ethyl-2-thenyl chrysanthemate.

References Cited

UNITED STATES PATENTS

| | | | |
|---|---|---|---|
| 2,815,362 | 12/1957 | Harper | 260—464 |
| 2,964,528 | 12/1960 | Wicker et al. | 260—294.8 |
| 3,106,566 | 10/1963 | McCall et al. | 260—332.2 |
| 3,358,011 | 12/1967 | Elliott | 260—468 |
| 3,047,611 | 7/1962 | Moore et al. | 260—468 |

OTHER REFERENCES

Katsuda et al., Agr. Biol. Chem., vol. 31, No. 2, pp. 259–60, February 1967.

Morrison et al., Org. Chem. (Allyn & Bacon, Boston, 1965), pp. 482–3.

HENRY R. JILES, Primary Examiner

C. M. SHURKO, Assistant Examiner

U.S. Cl. X.R.

260—332.3, 332.5, 468, 501.1, 514, 544, 546; 424—275